United States Patent

[11] 3,633,568

[72] Inventor Peter Hobel
Erlangen, Germany
[21] Appl. No. 860,183
[22] Filed Sept. 23, 1969
[73] Assignee Siemens Aktiengesellschaft
Erlangen, Germany
[32] Priority Nov. 2, 1968
[33] Germany
[31] P 18 06 092.7

[54] AUTOMATICALLY OPERATING APPARATUS FOR MEASURING BLOOD PRESSURE
5 Claims, 9 Drawing Figs.
[52] U.S. Cl. .................................................. 128/2.05 M
[51] Int. Cl. .................................................. A61b 5/02
[50] Field of Search .................................... 128/2.05 A,
2.05 G, 2.05 M, 2.05 P, 2.05 Q, 2.05 R, 2.05 S, 2.05 V

[56] References Cited
UNITED STATES PATENTS
| | | | |
|---|---|---|---|
| 2,827,040 | 3/1958 | Gilford | 128/2.05 A |
| 2,865,365 | 12/1958 | Newland et al. | 128/2.05 A |
| 3,101,082 | 8/1963 | Steen et al. | 128/2.05 M |
| 3,126,886 | 3/1964 | Karsh | 128/2.05 M |
| 3,308,811 | 3/1967 | Gillette et al. | 128/2.05 M |
| 3,405,707 | 10/1968 | Edwards | 128/2.05 M |

Primary Examiner—William E. Kamm
Attorney—Richards and Geier

ABSTRACT: An automatically operating apparatus for measuring blood pressure includes a tying-up cuff capable of being inflated, means receiving voltage impulses corresponding to blood pulsations, an amplifier for these voltage impulses, impulse treating members connected behind the amplifier and an electrical operating device which automatically indicates the diastolic and systolic blood pressure during a cuff pressure cycle depending upon Korotkoff impulses. The apparatus is particularly characterized by two impulse treating channels connected in parallel to the outlet of the amplifier. One of these channels has a filter which passes through that frequency portion of the received total signal which contains the Korotkoff impulses, a first impulse forming device being connected behind this filter. The second channel contains a second impulse forming device. These two impulse forming devices change the signals introduced into them into direct voltage impulses which are amplitudinally dependent upon the Korotkoff impulses or the total signal. The outlets of the two impulse forming devices are connected to a comparison device which delivers an impulse to an operating device when the outgoing values resulting from comparing the amplitudes of the outgoing signals of the impulse forming devices, exceed a predetermined value which is characteristic for the appearance of Korotkoff impulses.

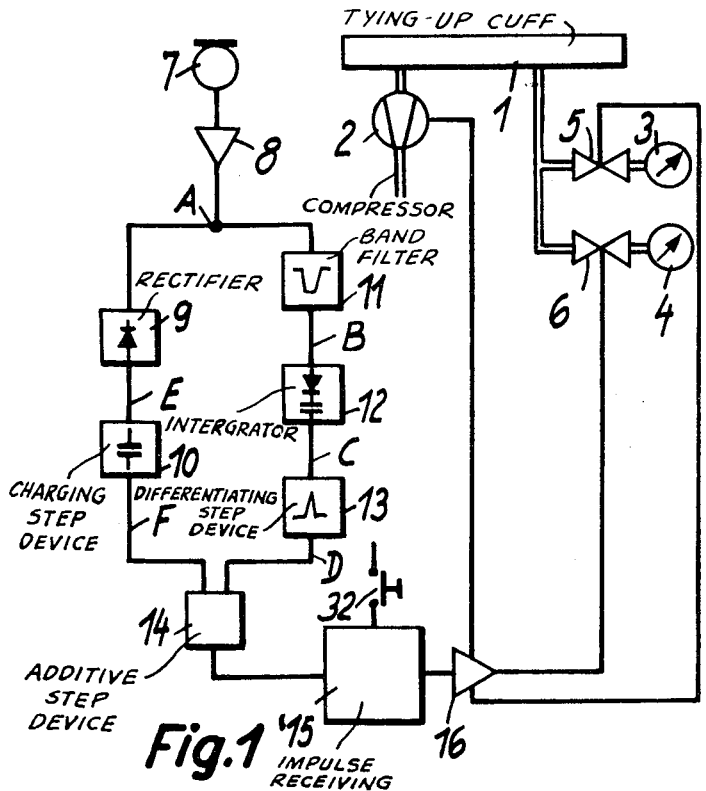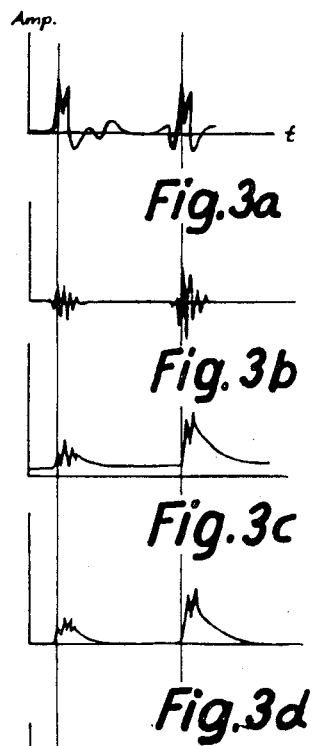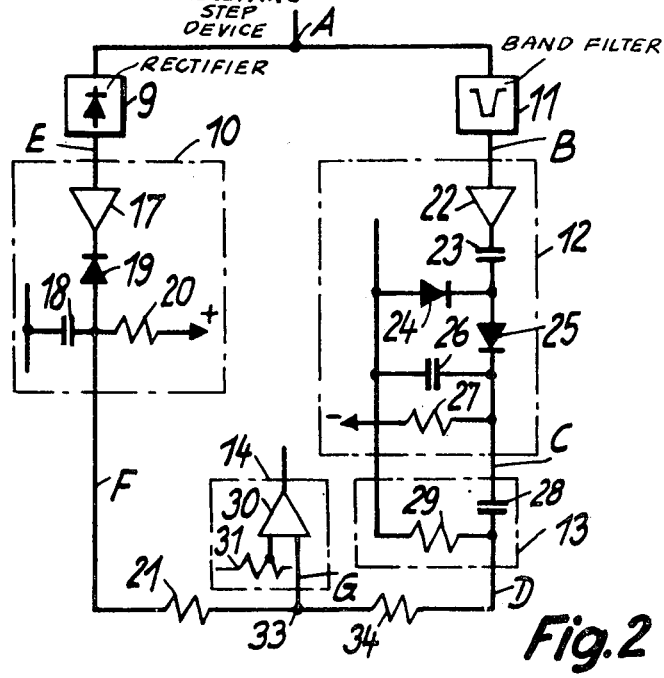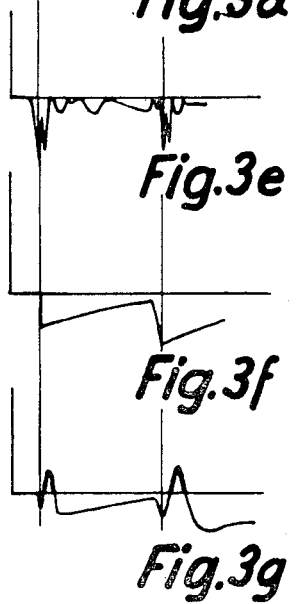

AUTOMATICALLY OPERATING APPARATUS FOR MEASURING BLOOD PRESSURE

This invention relates to an automatically operating apparatus for measuring blood pressure with a tying-up cuff capable of being inflated, a device producing voltage impulses corresponding to blood pulsations, an amplifier for these voltage impulses, impulse treating devices connected to the outlet of the amplifier and an electrical operating device which during a cuff pressure cycle automatically indicates the diastolic and systolic blood pressure depending upon the so-called Korotkoff impulses. According to this apparatus the voltage impulses corresponding to the blood pulsations contain all information received from the device producing the voltage impulses, including the Korotkoff impulses.

U.S. Pat. No. 2,827,040 describes an automatically operating blood pressure measuring device of this type which uses a microphone with amplifier distally mounted upon the extremity and determining the diastolic and systolic blood pressure values. In this device the tying-up cuff is connected with outside air by an outlet nozzle and a temperature responsive electrical resistance is located at the outlet of the nozzle. Pressure pulsations of the blood vessel are transmitted to the cuff and provide that air flows out of the nozzle in rhythm with these pulsations. This rhythmically cools the temperature responsive electrical resistance and thus produces an electrical signal corresponding to each pulse. This signal is used to provide confirmation with the pulses received by the microphone, in that the signals received by the microphone transmit an impulse to an operating device only if a pressure pulsation was measured at the same time. In this way a certain insensibility of the device to disturbances is attained. This prior art device requires a fairly large technical structure to eliminate disturbing sounds which are not connected at the same time with pressure changes in the cuff, since, in order to make possible the requirement of simultaneousness and thus the possibility of mutual confirmation of the received signals, signals received from the microphone must be correspondingly delayed due to the pneumatic transmission of the pressure impulses and also due to the heat capacity of the temperature-dependent electrical resistance.

The difference in time between a signal supplied by the microphone and the corresponding signal supplied by the temperature-dependent electrical resistance, depends upon the location of application of the cuff and of the microphone. Thus it is necessary to either provide a firm connection between the cuff and the microphone or to set the required delay for each measurement corresponding to locations of application of the microphone and the cuff. This setting is also necessary when the strength of the expected pressure pulsations of different patients is quite different.

As already indicated, when operating this prior art device, the possibility cannot be excluded that disturbances, such as, for example, the touching of the cuff which will produce an acoustic as well as a pressure signal, will be accepted by the device as actuating signals. Furthermore, there is the danger that the pneumatic conduit between the cuff and the outlet nozzle will be bent or that the nozzle opening gets dirty. Despite the comparatively large technical expenditure, this prior art device does not provide adequate safety for eliminating disturbing sounds or the necessary operational security and simplicity in use.

An object of the present invention is to improve prior art devices through the provision of a blood measuring apparatus of the described type which provides an extensive security against disturbances, which is simple in operation and inexpensive in manufacture.

Another object is the provision of an apparatus of this type which does not require a calibration before each measurement.

Other objects of the present invention will become apparent in the course of the following specification.

In the accomplishment of the objectives of the present invention it was found desirable to connect two impulses treating channels to the outlet of the amplifier. One of these impulse treating channels has a filter which lets through that frequency portion of the entire received signals which preferably contains the Korotkoff impulses, and a first impulse forming device connected to the outlet of the filter. The other impulse treating channel has a second impulse forming device. These two impulse forming devices change the signals introduced into them into direct voltage impulses which are amplitudinally dependent upon the Korotkoff impulses or the total signal. A comparison device is connected to the outlets of the two impulse forming devices and delivers an impulse to the operating device when the outgoing values resulting from comparing the amplitudes of the outgoing signals of the impulse forming devices exceed a predetermined value which is characteristic for the appearance of the Korotkoff impulses.

Thus in accordance with the blood measuring device of the present invention the control of the outgoing signal of the impulse forming device located behind the filter is carried out by the entire signal supplied by the receiving device. An actuating impulse is transmitted to the actuating device only when outgoing values resulting from a comparison of these signals exceed a predetermined value characteristic for the presence of a Korotkoff impulse. The fact that this value is exceeded takes place independently from the amplitude of the signal supplied by the receiving device. Therefore a calibration of the apparatus, is not necessary any more. For this reason and due to the resulting insensitiveness of the blood pressure measuring apparatus of the present invention to scratching and scraping noises, it is possible for the patient under certain conditions to keep his clothing during the measuring under the measuring cuff; thus the measuring can also take place through the clothing.

The apparatus of the present invention is rendered still more reliable by connecting behind the filter an impulse integrator with two diodes and behind this a differentiating step device and also when the second impulse forming device consists of a rectifying device and a following charging step device, the charge of which takes place with a small time constant compared to the duration of a pulse and the discharge of which takes place with a large time constant compared to the duration of a pulse. The impulse forming devices are preferably so constructed that their outgoing impulses have opposite poles. The comparison device preferably contains a threshold amplifier which receives the sum signal of these outgoing impulses and which is so adjusted that it supplies an actuating impulse only when a predetermined value of the sum signal is exceeded.

The invention will appear more clearly from the following detailed description when taken in connection with the accompanying drawing, showing, by way of example only, a preferred embodiment of the inventive idea.

In the drawing:

FIG. 1 is a block switch diagram of a blood pressure measuring apparatus of the present invention;

FIG. 2 shows a diagram of a device constituting a part of the apparatus shown in FIG. 1 and used for working on impulses corresponding to blood pulsations and Korotkoff impulses;

FIGS. 3a to 3g are diagrams showing the flow of voltage as a function of time at different locations of the apparatus shown in FIGS. 1 and 2.

FIG. 1 shows a tying-up cuff 1 which can be inflated by a compressor 2. Two manometers 3 and 4 are connected with the interior of the cuff 1 for measuring the diastolic and systolic blood pressure. Air carrying conduits leading to the manometers 3 and 4 are provided with electrically operated valves 5 and 6 which can be used to close the air carrying conduits and thus hold the diastolic and the systolic blood pressure.

A microphone 7 is the receiving member for producing voltage impulses corresponding to blood pulsations (as a total signal). An amplifier 8 is connected behind the microphone 7. Two impulse treating channels are connected in parallel to the outlet of the amplifier. One of these channels has a band filter 11 which passes a frequency of about 15 to 30 Hz. for the Korotkoff impulses. An impulse integrator 12 with two diodes is attached behind the filter 11 and is followed by a differentiating step device 13. The other channel has a rectifier 9 and a following charging step device 10 with different charging and discharging constants. A precise linear treatment within a wide dynamic range takes place in the two impulse treating channels, particularly a rectification of the incoming signals transmitted to the channels. The outlet of the charging step device 10 and the outlet of the differentiating step device 13 are connected with an additive step device 14 the outlet of which is connected with an actuating device consisting of an impulse treating step device 15 and an actuating amplifier 16. The compressor 2 and the valves 5 and 6 are connected with the amplifier 16. The additive step device 14 serves as a comparison member and in it take place a comparison of the amplitudes of the outgoing voltages of the charging step device 10 and the differentiating step device 13. Elements 15 and 16 are well known and are described, for example, in U.S. Pat No. 2,827,040.

FIG. 2 shows that the charging step device 10 consists of an amplifier 17 and a condenser arrangement connected to its outlet and consisting of a condenser 18, a charging diode 19 and a discharging condenser 20. The impulse integrator 12 contains an amplifier 22, a condenser 23, diodes 24 and 25, a charging condenser 26 and a charging resistance 27. The differentiating step device 13 includes a condenser 28 and a resistance 29.

The outgoing conduits of the two parallel branches are jointly connected to the inlet of a threshold amplifier 30 through resistances 21 and 34. The amplifier 30 is so set by a resistance 31 that an outgoing signal is transmitted to the impulse treating step device 15 only when the sum signal transmitted to its inlet will exceed a previously predetermined fixed value.

The operation of the described apparatus will now be described, reference being also had to FIGS. 3a to 3g:

When the starting key 32 is actuated, the compressor 2 will start operating and will inflate the cuff 1. Valves 5 and 6 are still open, so that the manometers 3 and 4 will indicate pressure in the cuff 1. Microphone 7 receives the blood pulsations, so that an impulse voltage corresponding thereto is transmitted to the filter 11 and the rectifier 9. Initially there will be no signal voltage at the outlet of the filter 11 since voltage supplied by the microphone does not contain initially any Korotkoff impulses. Therefore, the differentiating step device 13 and consequently the additive step device 14 do not supply as yet an outgoing signal.

When, however, the impulse voltage will contain Korotkoff impulses at the outlet of the amplifier 8 (point A), then it can have, for example, the flow indicated in FIG. 3a. The heavy lined curve portions correspond to the Korotkoff impulses. The voltage flow at the outlet B of the filter 11 is indicated in FIG. 3b. FIG. 3b shows that the filter 11 was caused to oscillate by a Korotkoff impulse and that this oscillation had terminated before the arrival of a new Korotkoff impulse. FIG. 3c shows the flow of voltage at the outlet C of the impulse integrator 12. The integrator 12 produces a rectification and a summing up os the rectified voltage. For that reason, the maximum voltage at the location C is somewhat later than the maximum voltage at the location B. The charging condenser 26 which received rectified voltage charge impulses from the charge diode 25, is used to sum up the rectified voltage. The charging operation takes place by the condenser 23 along with the diode 24. Immediately thereafter, a differentiation of this voltage takes place through the differentiating step device 13 consisting of the condenser 28 and the resistance 29. Then the outgoing voltage of the differentiating step device 13 has at location D the flow shown in FIG. 3d. The differentiating step device 13 sieves out continuous disturbing values which are noticeable at the location C by direct voltage components.

At the outlet of the rectifier 9 having corresponding poles, namely, at the location E, there is the voltage which flows in accordance with the diagram of FIG. 3e. The following charging step device 10 has a small time constant in comparison to the duration of a pulse for the charging operation and a large time constant for the discharge operation. This is attained by coupling the outlet of the impulse amplifier 17 to the condenser 18 through the charging diode 19, so that a quick charging of the condenser 18 through the diode 19 will take place when negative voltage is located at the outlet of the amplifier 17, while when the diode 19 is locked, the condenser 18 will comparatively slowly discharge through the discharge resistance 20 which is greater than the transmission resistance of the diode 19. Thus the voltage at the location F will flow as shown in FIG. 3f.

The outgoing impulses of the charging step device 10 and of the differentiating step device 13 are superposed or added at the point 33, so that the voltage at the location G will have the flow shown in FIG. 3g. The threshold voltage of the amplifier 30 which corresponds to the abscissa of the diagram of FIG. 3g, is so set through the resistance 31 that when a Korotkoff impulse appears only a single narrow impulse, which is shown by heavier lines in FIG. 3g, is amplified by the amplifier 30 and is then transmitted to the impulse treating step device 15; it will fall into the flat rising part of the curve shown in FIG. 3f due to the quick charging of the condenser 18. If there is no Korotkoff impulse, then the sum voltage at the location G is always below the threshold voltage of the amplifier 30.

FIGS. 3a to 3g indicate that an impulse will be transmitted from amplifier 30 to the impulse treating step device 15 only when the voltages at the locations D and F in their superposition exceed a predetermined value. When scraping or scratching noises or prepulses occur the outlet voltage of filter 11 actually always reaches an amplitude which is smaller than that shown in FIG. 3b, since the frequency of these disturbing impulses usually deviates from the resonance frequency of the filter 11 and, in that case, the voltage at the location G will not exceed the swell voltage of the amplifier 30 and thus there is no falsification of the results of measurements.

Since the maximum voltage at the point G can be easily shifted in relation to the maximum voltage at the point B, it is safe to assume that the threshold voltage of the amplifier 30 will not be exceeded in the dropping part of voltage at the location F, so that then no erroneous impulses can take place.

The described blood pressure measuring device of the present invention does not have to be adapted to individual patients since the criterium for recognizing Korotkoff impulses is not the absolute value of the voltage but a value resulting from the superposition of two voltages which to a great extent is independent from the amplitude of the voltage delivered by the receiving member, namely, the microphone 7.

The described apparatus of the present invention has a single-receiving member so that it is easy to operate and provides a great safety with respect to disturbing impulses affecting the receiving member.

Investigations which have been carried out have determined on the basis of a series of experiments a characteristic value (the threshold voltage of the amplifier 30) for the appearance of Korotkoff impulses. A series of following investigations have shown that the value which has thus been determined applies to all patients.

Further treatment of Korotkoff impulses can take place as follows:

When the first diastolic Korotkoff impulse takes place, the impulse treating stage device 15 will give to the steering amplifier 16 a signal for closing the valve 5. The diastolic blood pressure is then held in the manometer 3. If two following Korotkoff impulses take place during a predetermined time period after the first Korotkoff impulse, they will thus confirm the first Korotkoff impulse and, when a third Korotkoff impulse takes place, the impulse treating step 15 will deliver a closing signal to the valve 6 through the amplifier 16. During each of the thereafter following Korotkoff impulses, the valve 6 will be opened for a short time, so that after the last Korotkoff impulse, the systolic blood pressure will be indicated by the manometer 4. If, after the last Korotkoff impulse, no further Korotkoff impulses appear within a predetermined time, the actuating amplifier 16 will transmit a switch off signal to the compressor 2. Air is then removed from the cuff 1 by any suitable known means (not shown). The diastolic and the systolic blood pressure have been fed into the manometers 3 and 4 and can be inspected thereon.

I claim:

1. An automatically operating apparatus for measuring blood pressure, comprising a patient's cuff capable of being inflated, means inflating said cuff to diastolic and systolic blood pressure values of the person being examined, a member connected with said cuff for producing voltage impulses corresponding to the Korotkoff impulses, an amplifier connected with said member for amplifying said voltage impulses, indicating means, an electrical operating device connected with said amplifier and said indicating means for automatically indicating diastolic and systolic blood pressure depending upon Korotkoff impulses during a cuff pressure cycle, two impulse treating channels connected in parallel to said amplifier, one of said channels comprising a filter connected to the amplifier and transmitting frequencies containing Korotkoff impulses, and a first impulse forming device connected to said filter, the other one of said channels comprising a second impulse forming device connected to said amplifier, the two impulse forming devices changing signals introduced into them into direct voltage impulses amplitudinally dependent upon Korotkoff impulses and total signal, a comparison device connected with the outlets of the two impulse forming devices, and an actuating device connected with said comparison device, said comparison device delivering an impulse to said actuating device when the outgoing values resulting from comparing the amplitudes of the outgoing signals of the impulse forming devices exceed a predetermined value which is characteristic for the appearance of Korotkoff impulses.

8. An apparatus in accordance with claim 1, wherein said first impulse forming device consists of an impulse integrator with two diodes and a differentiating step device connected in series with said integrator.

3. An apparatus in accordance with claim 1, wherein said second impulse forming device comprises a rectifying device for rectifying impulses emitted by said amplifier and a charging step device connected in series with said rectifying device and comprising a condenser charged by appearing Korotkoff impulses with a small time constant as compared to the duration of a pulse and a resistance connected with said condenser for the following discharging of said condenser by a time constant large as compared to the duration of a pulse.

4. An apparatus in accordance with claim 3, comprising an amplifier and a diode, the last-mentioned amplifier and said diode connecting said rectifying device with said condenser, said valve permitting the passage only of such impulses which have the size of Korotkoff impulses.

5. An apparatus in accordance with claim 3, wherein the polarity of said rectifying device is such that the outgoing impulses of said impulse forming members have opposed polarity and wherein said comparison device comprises a threshold amplifier receiving the sum signal of the outgoing impulses and set to provide an actuating impulse only when a predetermined value of said sum signal is exceeded.

* * * * *